US010879949B2

(12) United States Patent
Tamer et al.

(10) Patent No.: US 10,879,949 B2
(45) Date of Patent: Dec. 29, 2020

(54) DEVICE, SYSTEM AND METHOD FOR REDUCING COMMUNICATIONS CROSSTALK BETWEEN CHANNELS

(71) Applicants: THALES DEFENSE & SECURITY, INC., Clarksburg, MD (US); 3M INNOVATIVE PROPERTIES COMPANY, Saint Paul, MN (US)

(72) Inventors: Gregory George Tamer, Fishers, IN (US); David Lawrence Albean, Indianapolis, IN (US); John Edward Baczewski, Damascus, MD (US); Raul Bolivar Montalvo, North Potomac, MD (US); Grant Colin Wünsch, North Potomac, MD (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/283,659

(22) Filed: Feb. 22, 2019

(65) Prior Publication Data

US 2019/0326945 A1    Oct. 24, 2019

Related U.S. Application Data

(63) Continuation of application No. 14/885,643, filed on Oct. 16, 2015, now Pat. No. 10,230,420.

(Continued)

(51) Int. Cl.
*H04B 1/525* (2015.01)
*H04B 7/26* (2006.01)
*H04W 4/10* (2009.01)

(52) U.S. Cl.
CPC ............. *H04B 1/525* (2013.01); *H04B 7/26* (2013.01); *H04W 4/10* (2013.01)

(58) Field of Classification Search
CPC ........ H04B 1/525; H04B 7/26; H04B 1/3888; H04B 3/234; H04B 7/005; H04B 1/44;
(Continued)

(56) References Cited

U.S. PATENT DOCUMENTS 6,160,790 A    12/2000 Bremer
6,694,019 B1    2/2004 Song
(Continued)

OTHER PUBLICATIONS

International Search Report of PCT/US2015/56043 dated Jan. 6, 2016.
(Continued)

*Primary Examiner* — Jianxun Yang
(74) *Attorney, Agent, or Firm* — Arent Fox LLP (57) ABSTRACT

A device for reducing communications crosstalk including a plurality of channel inputs each configured to receive an incoming signal from a respective device. The device further includes at least one control input configured such that, when the control input is triggered, the control input activates a voltage divider that attenuates at least one of the incoming signals, thereby reducing crosstalk between a first channel carrying the at least one attenuated incoming signal and a second channel not carrying the at least one attenuated incoming signal. The at least one attenuated incoming signal and the remaining incoming signals are output to a respective receiver.

17 Claims, 6 Drawing Sheets

Related U.S. Application Data

(60) Provisional application No. 62/064,873, filed on Oct. 16, 2014.

(58) Field of Classification Search
CPC .... H04B 1/385; H04W 4/10; H04M 2250/10; H04M 1/0214; H04M 1/03; G02F 1/163; H03G 3/3026
See application file for complete search history.

(56) References Cited

U.S. PATENT DOCUMENTS

| | | | |
|---|---|---|---|
| 2007/0097484 A1* | 5/2007 | Libretto | G02F 1/163 359/275 |
| 2007/0206829 A1* | 9/2007 | Weinans | H04R 1/1041 381/370 |
| 2008/0165949 A9 | 7/2008 | Hancock | |
| 2009/0090610 A1* | 4/2009 | Grimm | B60T 13/683 200/520 |
| 2010/0150383 A1* | 6/2010 | Sampat | H04R 1/10 381/311 |
| 2010/0172522 A1 | 7/2010 | Mooring et al. | |
| 2011/0269411 A1 | 11/2011 | Yamkovoy et al. | |
| 2012/0250889 A1* | 10/2012 | Millett | H03G 3/3026 381/107 |
| 2013/0281034 A1 | 10/2013 | Mazzeo et al. | |
| 2013/0329610 A1 | 12/2013 | Fraser | |
| 2014/0057574 A1* | 2/2014 | Tealdi | H04B 1/44 455/69 |
| 2014/0376753 A1 | 12/2014 | Nystrom et al. | |

OTHER PUBLICATIONS

Extended European Search Report of European Patent Application No. 15850152.8 dated May 23, 2018.

* cited by examiner

DEVICE, SYSTEM AND METHOD FOR REDUCING COMMUNICATIONS CROSSTALK BETWEEN CHANNELS

CROSS-REFERENCE TO RELATED APPLICATIONS

This application is a continuation of U.S. patent application Ser. No. 14/885,643, filed on Oct. 16, 2015, which claims the benefit of U.S. Provisional Patent Application No. 62/064,873 titled "DEVICE, SYSTEM AND METHOD REDUCING COMMUNICATIONS CROSSTALK BETWEEN CHANNELS" filed on Oct. 16, 2014, which is incorporated herein by reference in its entirety.

FIELD

The disclosure relates generally to the field of radio frequency communication systems, and more specifically to devices, systems, and methods for reducing communications crosstalk between channels in a radio system.

BACKGROUND

In the military, many communications officers may carry multiple radios on their missions. Some radios may include a communication headset that allows the users to hear audio from a first radio in the left ear, and audio from a second radio in the right ear. When the officer is communicating using voice over the first radio while listening to an audio output on the second radio, the audio output signal from the second radio may interfere with the voice audio input signal on the first radio. This interference is referred to as crosstalk, which may result in conversation crossover where an intended recipient of the voice communication on the first radio hears both the voice of the user as well as the audio output of the second radio. Such communications crosstalk is highly undesirable, especially in a military setting, as it may create a security risk as well as undesirable audio interference. One solution of reducing crosstalk would be to mute the channel on which the audio output is received while transmitting on the input channel. In military applications, however, such a solution is unacceptable because it is important to be able to hear all incoming communications on the output channels even while transmitting on the input channel. Therefore, there exists an unmet need in the art for devices, systems, and methods for reducing crosstalk in radio communications while simultaneously receiving and transmitting audio communications on both output and input channels.

SUMMARY

According to an aspect of the invention, a device is provided for reducing communications crosstalk comprising a plurality of channel inputs each configured to receive an incoming signal from a respective device. The device my include at least one control input configured such that, when the control input is triggered, the control input activates a voltage divider that attenuates at least one of the incoming signals, thereby reducing crosstalk between a first channel carrying the at least one attenuated incoming signal and a second channel not carrying the at least one attenuated incoming signal. The at least one attenuated incoming signal and the remaining incoming signals may be output to a respective receiver.

According to another aspect of the invention, a device for reducing communications crosstalk is provided, the device comprising: a first transceiver including a first input channel configured to carry a first audio input signal and a first output channel configured to carry a first audio output signal; a second transceiver including a second input channel configured to carry a second audio input signal and a second output channel configured to carry a second audio output signal; a first controller coupled to the first transceiver and the second transceiver, the first controller being configured to reduce crosstalk between the first output channel and the second input channel by attenuating the first audio output signal on the first output channel; and a second controller, coupled to the first transceiver and the second transceiver, the second controller being configured to reduce crosstalk between the second output channel and the first input channel by attenuating the second audio output signal on the second output channel.

According to another aspect of the invention, a method for reducing communications crosstalk between channels of a first transceiver and a second transceiver is provided, the first transceiver including a first input channel configured to carry a first audio input signal and a first output channel configured to carry a first audio output signal, the second transceiver including a second input channel configured to carry a second audio input signal and a second output channel configured to carry a second audio output signal, the method comprising: receiving the first audio output signal on the first output channel; receiving a first control signal to open the second input channel; enabling communications on the second input channel in response to the first control signal; and attenuating the first audio output signal in response to the first control signal.

According to another aspect of the invention, an apparatus for reducing audio crosstalk between channels of a first transceiver and a second transceiver is provided, the first transceiver including a first input channel configured to carry a first audio input signal and a first output channel configured to carry a first audio output signal, the second transceiver including a second input channel configured to carry a second audio input signal and a second output channel configured to carry a second audio output signal, the apparatus comprising: means for receiving the first audio output signal on the first output channel; means for receiving a first control signal to open the second input channel; means for enabling communications on the second input channel in response to the first control signal; and means for attenuating the first audio output signal in response to the first control signal.

According to another aspect of the invention, a non-transitory computer-readable medium for implementation on a device for reducing audio crosstalk between channels of a first transceiver and a second transceiver is provided, the first transceiver including a first input channel configured to carry a first audio input signal and a first output channel configured to carry a first audio output signal, the second transceiver including a second input channel configured to carry a second audio input signal and a second output channel configured to carry a second audio output signal, the non-transitory computer-readable medium comprising executable code for causing a computer to: receive the first audio output signal on the first output channel; receive a first control signal to open the second input channel; enable communications on the second input channel in response to the first control signal; and attenuate the first audio output signal in response to the first control signal.

Various advantages of aspects of the invention will be realized and attained by virtue of the elements and combinations particularly pointed out in the claims.

It is to be understood that both the foregoing general description and the following detailed description are examples only and explanatory and are not restrictive of the invention, as claimed.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

DETAILED DESCRIPTION

Example aspects of the present invention are described herein in the context of devices, systems, methods and computer-readable media for reducing communications crosstalk between channels in a radio system. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same items.

Figure 1:
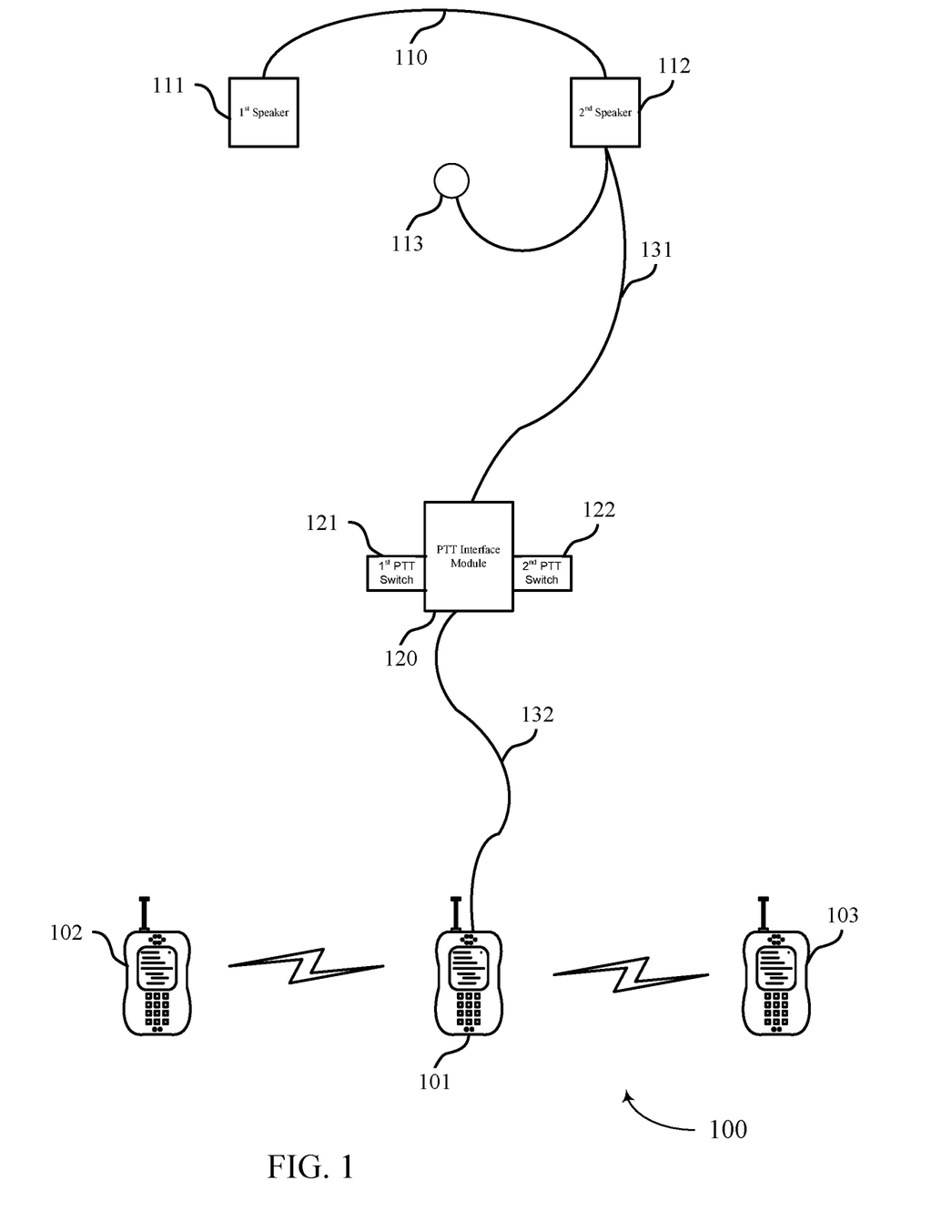
FIG. 1 is a diagram illustrating an example aspect of a radio system for reducing communications crosstalk between channels according to one aspect of the invention.

FIG. 1 is a diagram illustrating an example aspect of a radio system 100 for reducing communications crosstalk between channels according to one aspect of the invention. As shown in FIG. 1, the system 100 may include a first radio 101 that may be in communication with a second radio 102 and a third radio 103. The first radio 101 may be a dual channel hand-held radio that may operate on two different frequency bands simultaneously, essentially comprising two radios in one. For example, the first radio 101 may communicate with the second radio 102 on a first frequency band (e.g., VHF, covering 136-174 MHz) and may simultaneously communicate with the third radio 103 on a second frequency band (e.g., 800 MHz, covering 806-824 MHz and 851-869 MHz).

The first radio 101 may be connected to a headset 101 via a first lead 131, a push-to-talk (PTT) interface module 120, and a second lead 132. The headset 110 may include a first speaker 111, a second speaker 112, and a microphone 113. The first speaker 111 may output audio communications from the second radio 102, the second speaker may output audio communications from the third radio 103, and the microphone may be used to communicate with one or both of the second and third radios 102 and 103. Each of the first and second speakers 111 and 112 may, for example, have a resistance value of 230 ohms.

The PTT interface module 120 may include a first PTT switch 121 and a second PTT switch 122 that may be toggled to activate a transmit mode during which the microphone may be used to communicate with the second radio 102 and the third radio 103, respectively. Each of the first and second PTT switches 121 and 122 may, for example, be a button that a user may press to activate the transmit mode on a specific channel. For example, toggling the first PTT switch 121 may connect the microphone 113 to a channel used for communicating audio signals to the third radio 103; and toggling the second PTT switch 122 may connect the microphone 113 to a channel used for communicating audio signals to the second radio 102. The PTT interface module 120 may also include components that, when triggered by the first and second PTT switches 121 and 122, respectively attenuate audio output signals destined for the first and second speakers 111 and 112 so as to reduce or eliminate any crosstalk between the audio output signals and audio input signals captured by the microphone 113. The details of this attenuation technique are described below with reference to FIG. 2.

Figure 2:
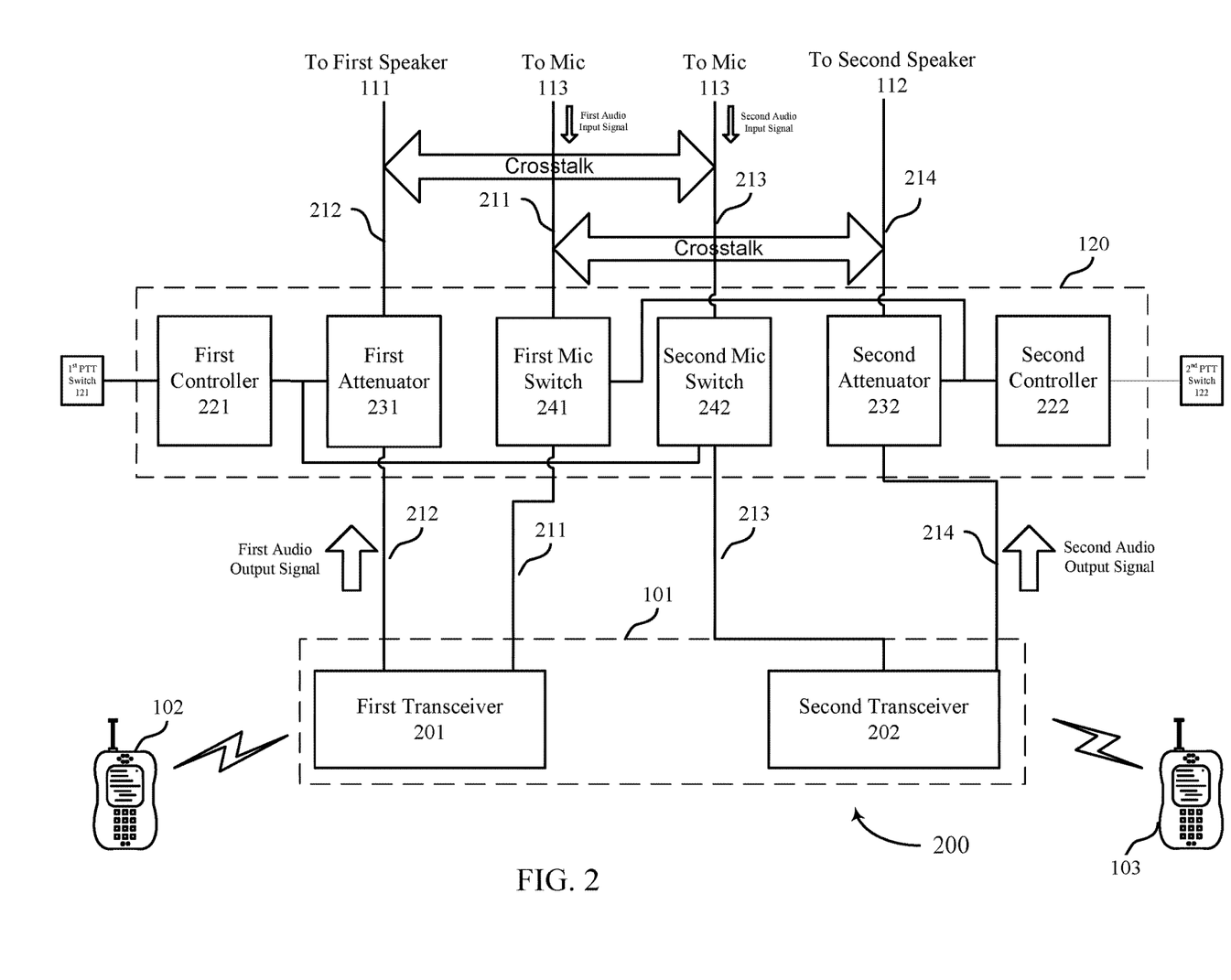
FIG. 2 is a system block diagram illustrating an example aspect of a device for reducing communications crosstalk between channels according to one aspect of the invention.

FIG. 2 is a system block diagram illustrating an example aspect of a device 200 for reducing communications crosstalk between channels according to one aspect of the invention. As shown in FIG. 2, the first radio 101 may include a first transceiver 201 and a second transceiver 202. Each of the first and second transceivers 201 and 202 may include a receiver that receives signals using a particular radio technology and a transmitter that transmits signal using a particular radio technology. For example, the first transceiver 201 may transmit and receive signals on the first frequency band (e.g., to and from the second radio 102); and the second transceiver 202 may transmit and receive signals on the second frequency band (e.g., to and from the third radio 103).

A number of input and output channels 211, 212, 213, 214 may couple the first and second transceivers 201, 202 to the headset 110 of FIG. 1 via the PTT interface module 120. Specifically, a first input channel 211 may couple the first transceiver 201 to the microphone 113 via the PTT interface module 120 and may be configured to carry a first audio input signal from the microphone 113 to the first transceiver 201. A first output channel 212 may couple the first transceiver 201 to the first speaker 111 via the PTT interface module 120 and may be configured to carry a first audio output signal from the first transceiver 201 to the first speaker 111. A second input channel 213 may couple the second transceiver 202 to the microphone 113 via the PTT interface module 120 and may be configured to carry a second audio input signal from the microphone 113 to the second transceiver 202. A second output channel 214 may couple the second transceiver 202 to the second speaker 112 via the PTT interface module 120 and may be configured to carry a second audio output signal from the second transceiver 201 to the second speaker 112. Each of the first and second input channels 211 and 213 constitute a small signal leg that may be configured to carry a signal having a first amplitude (e.g., 5 mV); and each of the first and second output channels 212 and 214 constitute a large signal leg that may be configured to carry a signal having a second amplitude (e.g., 5 V) that is larger than the first amplitude.

The lead 131 of FIG. 1 may include the portion of the input and output channels 211, 212, 213, 214 that couple the headset 110 to the PTT interface module 120; and the lead 132 of FIG. 1 may include the portion of the input and output channels 211, 212, 213, 214 that couple the PTT interface module 120 to the first and second transceivers 201, 202 of the first radio 101.

As shown in FIG. 2, the PTT interface module 120 may include a first attenuator 231 that may be coupled to the first speaker 111 and the first transceiver 201. The first attenuator 231 may be configured to reduce or eliminate crosstalk between the first output channel 212 and the second input channel 213 by attenuating the first audio output signal on the first output channel 212. The PTT interface module may also include a second attenuator 232 that may be coupled to the second speaker 112 and the second transceiver 202. The second attenuator 232 may be configured to reduce crosstalk between the second output channel 214 and the first input channel 211 by attenuating the second audio output signal on the second output channel 214.

The PTT interface module 120 may further include a first microphone switch 241 that may be coupled to the microphone 113 and the first transceiver 201, and a second microphone switch 242 that may be coupled to the microphone 113 and the second transceiver 202. The PTT interface module 120 may also include a first controller 221 that may be coupled to the first PTT switch 121, the first attenuator 231, and the second microphone switch 242; and a second controller that may be coupled to the second PTT switch 122, the second attenuator 232, and the first microphone switch 241.

During communication with the second and third radios 102 and 103, the user may set the radio to four different states of operation. During the first state of operation, the user may choose to only listen to the second radio 102 via the first speaker 111 and the third radio 103 via the second speaker 112 without activating the microphone 113. In this case, the user does not activate either the first PTT switch 121 or the second PTT switch 122 so as not to activate either the second microphone switch 242 or the first microphone switch 241. As such, during the first state of operation the first attenuator 231 may pass the first audio output signal on the first output channel 212 from the first transceiver 201 to the first speaker 111 without attenuating the first audio output signal; and the second attenuator 232 may pass the second audio output signal on the second output channel 214 from the second transceiver 202 to the second speaker 112 without attenuating the second audio output signal. During this time, both the first microphone switch 241 and the second microphone switch 242 are inactive and do not pass any signals on the first and second input channels 211, 213 to the first and second transceivers, 201, 202, respectively.

During the second state of operation, the user may choose to talk via the microphone 113 to the third radio 103 while listening to the second radio 102 via the first speaker 111 and the third radio 103 via the second speaker 112. In this case, the user may activate only the first PTT switch 121, which in turn may trigger the first controller 221 to activate the first attenuation circuit 231 and the second microphone switch 242. When the second microphone switch 242 is activated, it may pass the second audio input signal on the second input channel 213 from the microphone 113 to the second transceiver 202. When the first attenuator 231 is activated, it may attenuate the first audio output signal on the first output channel 212 thereby reducing or eliminating crosstalk between the first output channel 212 and the second input channel 213.

During the third state of operation, the user may choose to talk via the microphone 113 to the second radio 102 while listening to the second radio 102 via the first speaker 111 and the third radio 103 via the second speaker 112. In this case, the user may activate only the second PTT switch 122, which in turn may trigger the second controller 222 to activate the second attenuation circuit 232 and the first microphone switch 241. When the first microphone switch 241 is activated, it may pass the first audio input signal on the first input channel 211 from the microphone 113 to the first transceiver 201. When the second attenuator 232 is activated, it may attenuate the second audio output signal on the second output channel 214 thereby reducing or eliminating crosstalk between the second output channel 214 and the first input channel 211.

During the fourth state of operation, the user may choose to talk via the microphone 113 to both the second radio 102 and the third radio 103 while listening to the second radio 102 via the first speaker 111 and the third radio 103 via the second speaker 112. In this case, the user may activate both the first PTT switch 121 and the second PTT switch 122, which in turn may trigger the second controller 222 to activate the second attenuation circuit 232 and the first microphone switch 241, and the second controller 222 to activate the second attenuation circuit 232 and the first microphone switch 241. The result may be a combination of the second and third states of operation such that the first and second audio input signals are transmitted from the microphone 113 to the first and second transceivers 201 and 202, respectively; and the first and second audio output signals are attenuated on the first and second output channels 212 and 214, respectively.

Figure 3A:
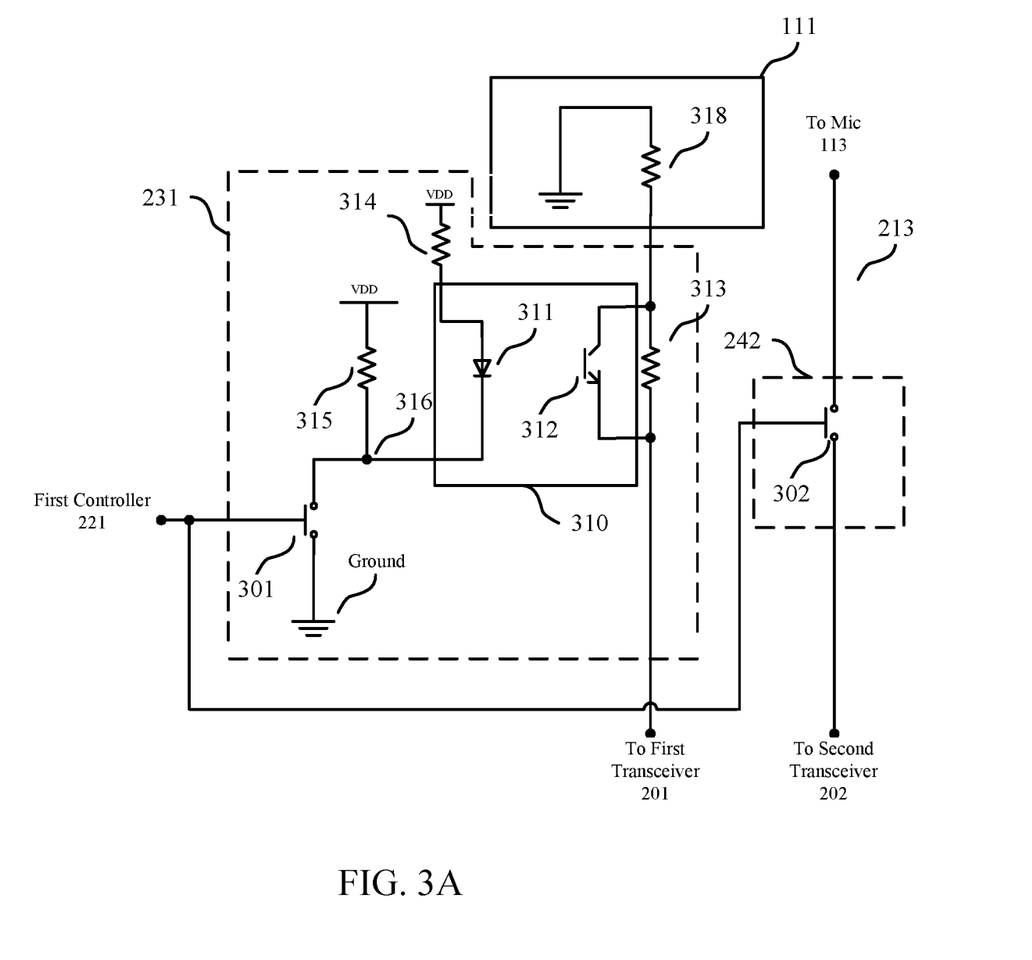
FIG. 3A is a circuit diagram illustrating an example aspect of an attenuator and a microphone switch for reducing communications crosstalk between channels according to one aspect of the invention.

FIG. 3A is a circuit diagram illustrating an example aspect of an attenuator 231 and a microphone switch 242 for reducing communications crosstalk between channels according to one aspect of the invention. As shown in FIG. 3A, the first attenuator 231 may include a first switch 301 coupled to the first controller 221, a first resistor 313 (e.g., 360 ohms) on the first output channel 212, a first attenuation component 310 coupled to the first resistor 313 and the first switch 301. The first switch 301 may be a push switch, a transistor, or other component that is capable of passing electric current once activated. The first attenuation component 310 may, for example, be an optoisolator or a similar component that is capable of controlling a signal flow across the output channel (e.g., first output channel 212). The first attenuation component 310 may include a first sensor 312 that is coupled in parallel with the first resistor 313, a first emitter 311 that is coupled in series with a second resistor 314 (e.g., 1 kohms) and the first switch 301, and a dielectric channel (not shown) disposed between the first emitter 311 and the first sensor 312. The second resistor 314 may be coupled at its other end to Vdd. The first emitter 311 may be a light emitting source, such as a light emitting diode (LED), or other component that may convert an electrical input signal into light. The first sensor 312 may be a photoresistor, a photodiode, a phototransistor, or other component that detects incoming light and either stops or impedes the flow of electric current through itself. The first attenuator 231 may optionally include a third resistor 315 (e.g., 10 kohms) connected at one end to Vdd and at the other end to a first node 316 connecting the first switch 301 and the first emitter 311 in order to maintain a high voltage at the first node 316. Vdd and ground may be power supply rails each having a specific voltage value that is suitable for proper operation of the circuit elements disclosed herein. For example, Vdd may be 5 V and ground may be 0 V.

As also shown in FIG. 3A, the second microphone switch 242 may include a second switch 302 on the second input channel 213. The second switch 302 may be coupled to the first controller 221 and may be configured to close (i.e., become conductive) upon activation by the first controller 221 so as to allow the second audio input signal to pass on the second input channel 213. The second switch 302 may be a push switch, a transistor, or other component that is capable of passing electric current once activated.

During the first and third states of operation, when the first controller 221 is not triggered, both first and second switches 301 and 302 remain in an open (i.e., non-conductive) state, preventing the flow of electric current. At this point, because the first switch 301 is open, the first node 316 is held at a high enough voltage level to ensure that there is insufficient voltage bias across the first emitter 311 to activate it. When the first emitter 311 is inactive, the first sensor 312 maintains a level of resistance that is sufficiently low when compared to that of the first resistor 313 in order to ensure that the first audio output signal flows through the first sensor 312 (i.e., first path) instead of through the first resistor 313 (i.e., second path). This allows the first audio output signal to remain unattenuated during the first and third states of operation.

During the second and fourth states of operation, when the first controller 221 is triggered to activate the first attenuation circuit 231 and the second microphone switch 242, the first controller 221 may activate both the first switch 301 of the first attenuator 231 and the second switch 302 of the second microphone switch 242. When the second switch 302 is activated, it transitions from an open (i.e., non-conductive) state to a closed (i.e., conductive) state that allows electric current to pass through itself, thus allowing the second audio input signal to pass on the second input channel 213 from the microphone 113 to the second transceiver 202.

When the first switch 301 is activated, it pulls the first node 316 down to ground, thus activating the first emitter 311 by allowing electric current to flow from Vdd down through the second resistor 314 and the first emitter 311 to ground. When the first emitter 311 is activated, it illuminates the first sensor 312, causing the first sensor 312 to increase its level of resistance to one that is greater than that of the first resistor 313. Once the level of resistance of the first sensor 312 is sufficiently high when compared to that of the first resistor 313, the flow of the first audio output signal is redirected from the first path that takes it through the first sensor 312 to the second path that takes it through the first resistor 313. The first resistor 313 and resistor 381 of the first speaker 111 form a voltage divider that attenuates the first audio output signal. As a result, forcing the first audio output signal to flow through the first resistor 313 attenuates the first audio output signal by an amount (e.g., 3 db to 9 db) that reduces or eliminates crosstalk between the first output channel 212 and the second input channel 213.

Figure 3B:
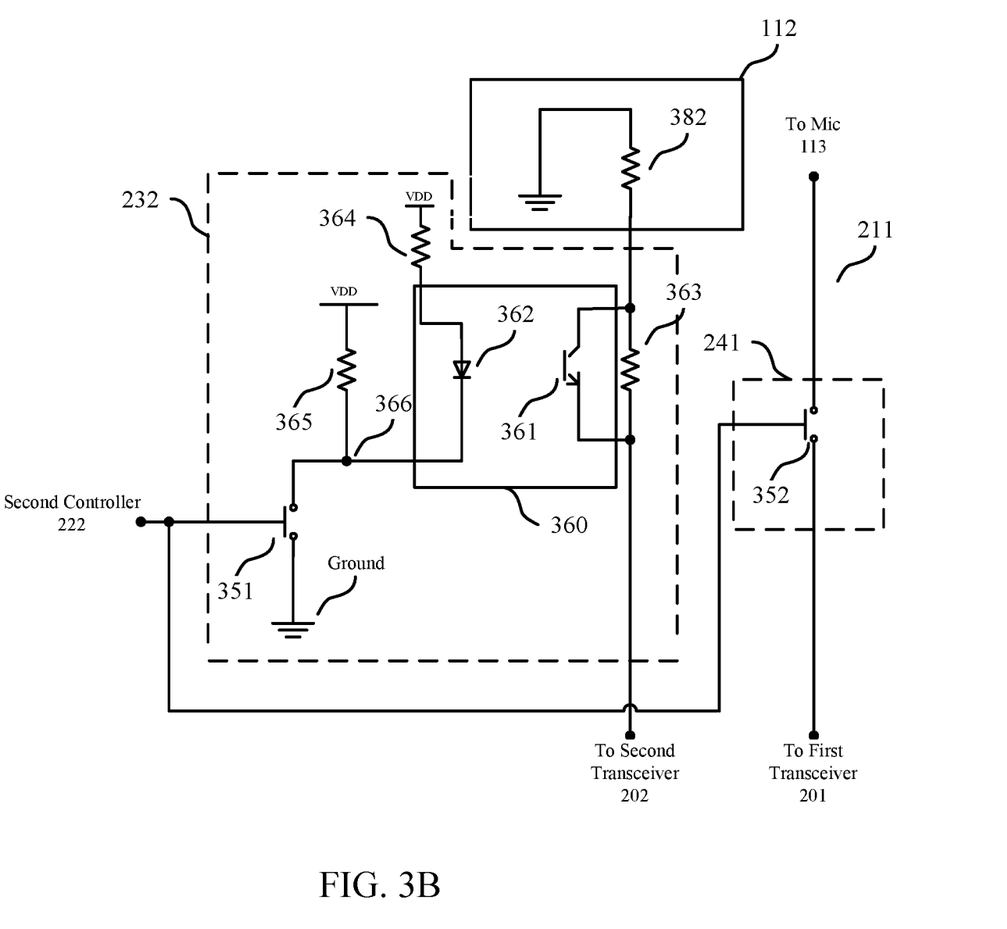
FIG. 3B is a circuit diagram illustrating an example aspect of an attenuator and a microphone switch for reducing communications crosstalk between channels according to one aspect of the invention.

FIG. 3B is a circuit diagram illustrating an example aspect of an attenuator 232 and a microphone switch 241 for reducing communications crosstalk between channels according to one aspect of the invention. Although the components and the operation of the second attenuator 232 and the first microphone switch 241 are similar to those of the first attenuator 231 and the second microphone switch 242, their description is included herein for completeness.

As shown in FIG. 3B, the second attenuator 232 may include a third switch 351 coupled to the second controller 222, a fourth resistor 363 (e.g., 360 ohms) on the second output channel 214, a second attenuation component 360 coupled to the fourth resistor 363 and the third switch 351. The third switch 351 may be a push switch, a transistor, or other component that is capable of passing electric current once activated. The second attenuation component 360 may, for example, be an optoisolator or a similar component that is capable of controlling a signal flow across the output channel (e.g., second output channel 214). The second attenuation component 360 may include a second sensor 362 that is coupled in parallel with the fourth resistor 363, a second emitter 361 that is coupled in series with a fifth resistor 364 (e.g., 1 kohms) and the third switch 351, and a dielectric channel (not shown) disposed between the second emitter 361 and the second sensor 362. The fifth resistor 364 may be coupled at its other end to Vdd. The second emitter 361 may be a light emitting source, such as a light emitting diode (LED), or other component that may convert an electrical input signal into light. The second sensor 362 may be a photoresistor, a photodiode, a phototransistor, or other component that detects incoming light and either stops or impedes the flow of electric current through itself. The second attenuator 232 may optionally include a sixth resistor 365 (e.g., 10 kohms) connected at one end to Vdd and at the other end to a second node 366 connecting the third switch 351 and the second emitter 361 in order to maintain a high voltage at the second node 366.

As also shown in FIG. 3B, the first microphone switch 241 may include a fourth switch 352 on the first input channel 211. The fourth switch 352 may be coupled to the second controller 222 and may be configured to close (i.e., become conductive) upon activation by the second controller 222 so as to allow the first audio input signal to pass on the first input channel 211. The fourth switch 352 may be a push switch, a transistor, or other component that is capable of passing electric current once activated.

During the first and second states of operation, when the second controller 222 is not triggered, both third and fourth switches 351 and 352 remain in an open (i.e., non-conductive) state, preventing the flow of electric current. At this point, because the third switch 351 is open, the second node 366 is held at a high enough voltage level to ensure that there is insufficient voltage bias across the second emitter 361 to activate it. When the second emitter 361 is inactive, the second sensor 362 maintains a level of resistance that is sufficiently low when compared to that of the fourth resistor 363 in order to ensure that the second audio output signal flows through the second sensor 362 (i.e., third path) instead of through the fourth resistor 363 (i.e., fourth path). This allows the second audio output signal to remain unattenuated during the first and second states of operation.

During the third and fourth states of operation, when the second controller 222 is triggered to activate the second attenuation circuit 232 and the first microphone switch 241, the second controller 222 may activate both the third switch 351 of the second attenuator 232 and the fourth switch 352 of the first microphone switch 241. When the fourth switch 352 is activated, it transitions from an open (i.e., non-conductive) state to a closed (i.e., conductive) state that allows electric current to pass through itself, thus allowing the first audio input signal to pass on the first input channel 211 from the microphone 113 to the first transceiver 201.

When the third switch 351 is activated, it pulls the second node 366 down to ground, thus activating the second emitter 361 by allowing electric current to flow from Vdd down through the fifth resistor 364 and the second emitter 361 to ground. When the second emitter 351 is activated, it illuminates the second sensor 362, causing the second sensor 362 to increase its level of resistance to one that is greater than that of the fourth resistor 363. Once the level of resistance of the second sensor 362 is sufficiently high when compared to that of the fourth resistor 363, the flow of the second audio output signal is redirected from the third path that takes it through the second sensor 362 to the fourth path that takes it through the fourth resistor 363. The fourth resistor 363 and resistor 382 of the second speaker 112 form a voltage divider that attenuates the second audio output signal. As a result, forcing the second audio output signal to flow through the fourth resistor 363 attenuates the second audio output signal by an amount (e.g., 3 db to 9 db) that reduces or eliminates crosstalk between the second output channel 214 and the first input channel 211.

Figure 4:
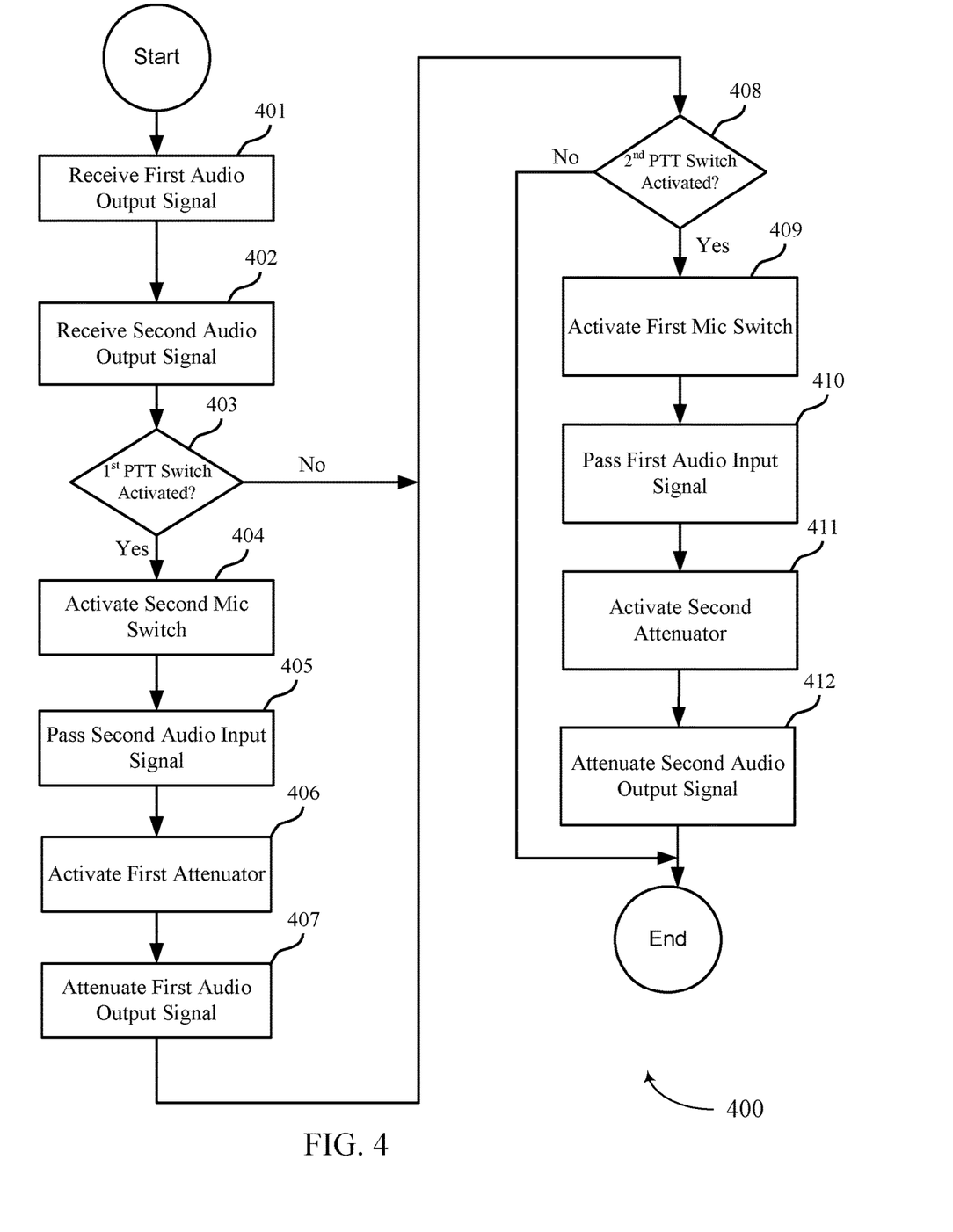
FIG. 4 is a flow diagram illustrating an example method for reducing communications crosstalk between channels according to one aspect of the invention.

FIG. 4 is a flow diagram illustrating an example method 400 for reducing communications crosstalk between channels according to one aspect of the invention. The process described in this flow diagram may be implemented in a hand-held radio system, such as the one shown in FIG. 1. As shown in FIG. 4, the process may begin in block 401, where a first audio output signal may be received. For example, the first audio output signal may be received on the first output channel 212 at the PTT interface module 120, and in particular, at the first attenuator 231. In block 402, a second audio output signal may be received. For example, the second audio output signal may be received on the second output channel 214 at the PTT interface module 120, and in particular, at the second attenuator 232.

In block 403, a determination is made as to whether or not a first PTT switch 121 has been activated. If it is determined that the first PTT switch 121 has been activated, the process may proceed to block 404; otherwise, the process may proceed to block 408. In block 404, the second microphone switch 242 may be activated; and in block 405, the activated second microphone switch 242 may pass the second audio input signal on the second input channel 213 from the microphone 113 to the second transceiver 202. The process may then proceed to block 406.

In block 406, the first attenuator 231 may be activated; and in block 407, the activated first attenuator 231 may attenuate the first audio output signal on the first output channel 212 so as to reduce or eliminate crosstalk between the first output channel 212 and the second input channel 212. The process may then proceed to block 408.

In block 408 a determination is made as to whether or not a second PTT switch 122 has been activated. If it is determined that the second PTT switch 122 has been activated, the process may proceed to block 409; otherwise, the process ends. In block 409, the first microphone switch 241 may be activated; and in block 410, the activated first microphone switch 241 may pass the first audio input signal on the first input channel 211 from the microphone 113 to the first transceiver 201. The process may then proceed to block 411.

In block 411, the second attenuator 232 may be activated; and in block 412, the activated second attenuator 232 may attenuate the second audio output signal on the second output channel 214 so as to reduce or eliminate crosstalk between the second output channel 214 and the first input channel 211.

Figure 5:
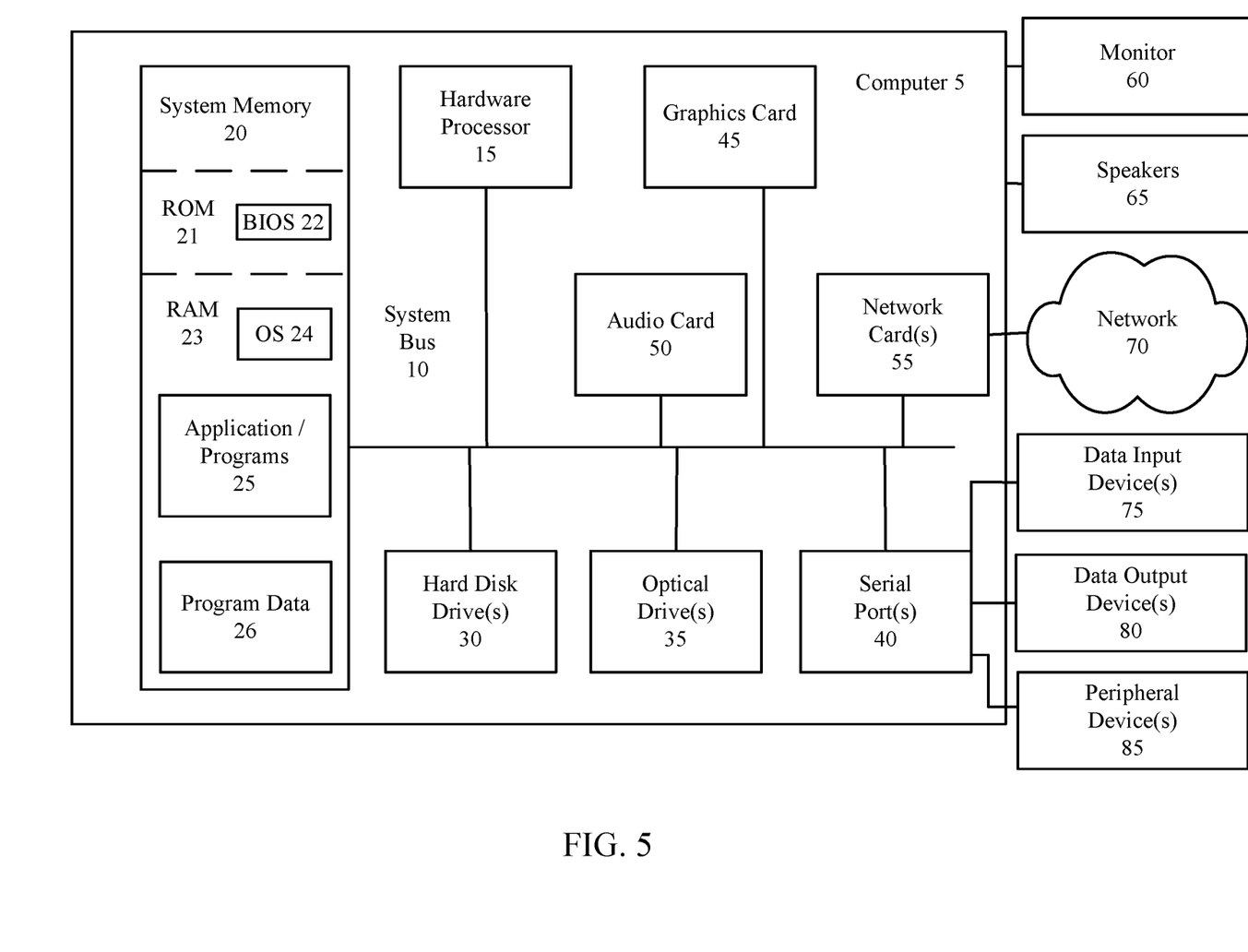
FIG. 5 is a diagram illustrating an example aspect of a general-purpose computer system on which are implemented the systems and methods for reducing communications crosstalk between channels according to one aspect of the invention.

FIG. 5 depicts one example aspect of a computer system 5 that may be used to implement the disclosed systems and methods for reducing communications crosstalk between channels according to one aspect of the invention. The computer system 5 may include, but not limited to, a personal computer, a notebook, tablet computer, a smart phone, a mobile device, a network server, a router, or other type of processing device. As shown, computer system 5 may include one or more hardware processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the modules of computer system 5, such as during start-up. RAM 23 stores operating system 24 (OS), such as Windows® 7 Professional or other type of operating system, that is responsible for management and coordination of processes and allocation and sharing of hardware resources in computer system 5. Memory 20 also stores applications and programs 25. Memory 20 also stores various runtime data 26 used by programs 25.

Computer system 5 may further include hard disk drive(s) 30, such as SATA HDD, and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative aspects of the computer system 5.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a display 60 or other video reproduction device, such as touch-screen display. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the invention, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

The invention claimed is:

1. A device for reducing communications crosstalk, the device comprising:
   a first transceiver configured to receive and transmit a first input signal and a first output signal, wherein the first input signal and first output signal comprise different audio signals;
   a second transceiver configured to receive and transmit a second input signal and a second output signal, wherein the second input signal and second output signal comprise different audio signals;
   a first controller coupled to the first transceiver and the second transceiver the first controller being configured to, in response to a first trigger generated by a user, attenuating the first output signal to a level within an audible range of the user; and
   a second controller coupled to the first transceiver and the second transceiver, and the second controller being configured to, in response to a second trigger generated by the user, attenuating the second output signal to a level within the audible range of the user;
   wherein the first transceiver and the second transceiver are in communication with a first external device and a second external device, respectively, the first external device and the second external device being configured to generate the first output signal and the second output signal, respectively;
   wherein the first input signal and the second input signal comprise signals generated by a headset;
   wherein the first controller is configured to attenuate the first output signal by redirecting the first output signal from a first path to a second path, and wherein the second controller is configured to attenuate the second output signal by redirecting the second output signal from a third path to a fourth path;
   wherein the first path and the third path each include a respective optoisolator, and the second path and the fourth path each include a respective resistor, and wherein each respective optoisolator includes a respective switch that is disposed in parallel with each respective resistor; and
   wherein with the first external device and the second external device are contained within a dual channel-hand-held radio.

2. The device of claim 1, wherein the first controller, in response to the first trigger, enables generation of the first input signal by the headset.

3. The device of claim 2, wherein the second controller, in response to the second trigger, enables generation of the first input signal by the headset.

4. The device of claim 1, wherein an electrical resistance of the second path is greater than that of the first path.

5. The device of claim 4, wherein the first controller, when triggered, is configured to operate the switch to place it in a non-conductive state, thereby redirecting the first output signal from the first path to the second path.

6. The device of claim 4, wherein the second controller, when triggered, is configured to operate the switch to place it in a non-conductive state, thereby redirecting the second output signal from the third path to the fourth path.

7. The device of claim 1, wherein the first trigger or the second trigger is generated by a push-to-talk button.

8. The device of claim 1, wherein the headset includes a microphone, and wherein the first input signal and the second input signal are generated via the microphone.

9. The device of claim 1, wherein the crosstalk between the first output signal and the second input signal is reduced by 3 db to 9 db.

10. A method for reducing communications crosstalk between channels of a first transceiver and a second transceiver, the first transceiver configured to receive and transmit a first input signal and a first output signal, wherein the first input signal and first output signal comprise different audio signals, the second transceiver configured to receive and transmit a second input signal and a second output signal, wherein the second input signal and second output signal comprise different audio signals, the method comprising:
   receiving the first output signal;
   receiving a first trigger generated by a user;
   enabling generation of the first input signal in response to the first trigger; and
   attenuating the first output signal to a level within an audible range of a user in response to the first trigger by redirecting the first output signal from a first path to a second path;
   receiving the second output signal;
   receiving a second trigger generated by a the user;

enabling generation of the second input signal in response to the second trigger; and attenuating the second output signal to a level within an audible range of a user in response to the second trigger by redirecting the second output signal from a third path to a fourth path;

wherein the first input signal and the second input signal comprise signals generated by a headset; and wherein the first output signal and the second output signal comprise signals generated by a first external device and a second external device, respectively;

wherein the first path and the third path each include a respective optoisolator, and the second path and the fourth path each include a respective resistor, and wherein each respective optoisolator includes a respective switch that is disposed in parallel with each respective resistor; and wherein with the first external device and the second external device are contained within a dual channel-hand-held radio.

11. The method of claim 10, wherein an electrical resistance of the second path is greater than that of the first path.

12. The method of claim 11, wherein attenuating the first output signal includes operating the switch to place it in a non-conductive state, thereby redirecting the first output signal from the first path to the second path.

13. The method of claim 11, wherein attenuating the second output signal includes operating the switch to place it in a non-conductive state, thereby redirecting the second output signal from the third path to the fourth path.

14. The method of claim 10, wherein the first trigger or the second trigger is generated by a push-to-talk button.

15. An apparatus for reducing audio crosstalk between channels of a first transceiver and a second transceiver, the first transceiver configured to receive and transmit a first input signal and a first output signal, wherein the first input signal and first output signal comprise different audio signals, the second transceiver configured to receive and transmit a second input signal and a second output signal, wherein the second input signal and second output signal comprise different audio signals, the apparatus comprising:

means for receiving the first output signal;
means for receiving a first trigger generated by a user;
means for enabling generation of the first input signal in response to the first trigger; and
means for attenuating the first output signal to a level within an audible range of a user in response to the first trigger by redirecting the first output signal from a first path to a second path;
means for receiving the second output signal;
means for receiving a second trigger generated by a the user;
means for enabling generation of the second input signal in response to the second trigger; and
means for attenuating the second output signal to a level within an audible range of a user in response to the second trigger by redirecting the second output signal from a third path to a fourth path;
wherein the first input signal and the second input signal comprise signals generated by a headset; and wherein the first output signal and the second output signal comprise signals generated by a first external device and a second external device, respectively;

wherein the first path and the third path each include a respective optoisolator, and the second path and the fourth path each include a respective resistor, and wherein each respective optoisolator includes a respective switch that is disposed in parallel with each respective resistor; and wherein with the first external device and the second external device are contained within a dual channel-hand-held radio.

16. A non-transitory computer-readable medium for implementation on a device for reducing audio crosstalk between channels of a first transceiver and a second transceiver, the first transceiver configured to receive and transmit a first input signal and a first output signal, wherein the first input signal and first output signal comprise different audio signals, the second transceiver configured to receive and transmit a second input signal and a second output signal, wherein the second input signal and second output signal comprise different audio signals, the non-transitory computer-readable medium comprising executable code for causing a computer to:

receiving the first output signal;
receiving a first trigger generated by a user;
enabling generation of the first input signal in response to the first trigger; and
attenuating the first output signal to a level within an audible range of a user in response to the first trigger by redirecting the first output signal from a first path to a second path;
receiving the second output signal;
receiving a second trigger generated by a the user;
enabling generation of the second input signal in response to the second trigger; and
attenuating the second output signal to a level within an audible range of a user in response to the second trigger by redirecting the second output signal from a third path to a fourth path;
wherein the first input signal and the second input signal comprise signals generated by a headset; and
wherein the first output signal and the second output signal comprise signals generated by a first external device and a second external device, respectively;
wherein the first path and the third path each include a respective optoisolator, and the second path and the fourth path each include a respective resistor, and wherein each respective optoisolator includes a respective switch that is disposed in parallel with each respective resistor; and
wherein with the first external device and the second external device are contained within a dual channel-hand-held radio.

17. The non-transitory computer-readable medium of claim 16, wherein an electrical resistance of the second path is greater than that of the first path.

* * * * *

UNITED STATES PATENT AND TRADEMARK OFFICE
CERTIFICATE OF CORRECTION

PATENT NO. : 10,879,949 B2
APPLICATION NO. : 16/283659
DATED : December 29, 2020
INVENTOR(S) : Gregory George Tamer et al.

It is certified that error appears in the above-identified patent and that said Letters Patent is hereby corrected as shown below:

On the Title Page

Item (72), The 5th Inventor's name reads "Grant Colin Wünsch", should read
-- Grant Colin Wunsch --

In the Specification

On Column 1, Line 11, after "METHOD" insert -- For --, therefor.

On Column 1, Line 58, delete "my" and insert -- may --, therefor.

In the Claims

On Column 12, Line 67, Claim 10, delete "a the" and insert -- a --, therefor.

On Column 13, Line 51, Claim 15, delete "a the" and insert -- a --, therefor.

On Column 14, Line 36, Claim 16, delete "a the" and insert -- a --, therefor.

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*